United States Patent Office 3,621,734
Patented Nov. 23, 1971

3,621,734
TORQUE-CONVERTER AND VARIABLE-RATIO
TRANSMISSION MECHANISM
Pierre Bouthors and Philippe Quemerais, Billancourt,
France, assignors to Regie Nationale des Usines
Renault, Billancourt, and Automobiles Peugeot, Paris,
France
Filed Feb. 16, 1970, Ser. No. 11,585
Claims priority, application France, Mar. 5, 1969,
6906116
Int. Cl. F16h *15/04, 47/06*
U.S. Cl. 74—730                                              5 Claims

ABSTRACT OF THE DISCLOSURE

A torque-converter and variable-ratio transmission mechanism in which the torque converter has its output shaft drivingly connected to a friction-type variator formed by a disc rigid with an input shaft and interposed between a pair of rings rigid with an output shaft. The variator is adapted, according to the clamped or released condition of the rings in relation to the disc, to cause the variator to be connected to, or disconnected from, the drive. The output shaft of the converter carries a driving pinion in constant meshing engagement with a pair of driven pinions, the first driven pinion being rigid with the input shaft of the variator, which has its output shaft connected to the output shaft of the mechanism via a couple of pinions providing the forward drive, the other driven pinion being mounted for loose rotation on the output shaft of the mechanism and provided with releasable coupling means for providing reverse drive without passing through the variator.

---

This invention relates in general to transmission mechanisms for automotive vehicles and other motor-powered vehicles, and has specific reference to a transmission mechanism comprising a hydraulic torque converter and a friction-type variator incorporating internally-tangent male and female tapered discs.

This invention aims at providing an improved mechanism capable of combining the advantages of the hydraulic torque converter (which ensures an efficient damping of engine vibration) with those of the variable-ratio mechanism comprising a single driving disc (providing a wide range of reduction ratios under reduced over-all dimensions), while affording a continuous change in the transmission ratio in forward drive and giving one reverse ratio.

This invention is also advantageous in that the different actions such as clamping the variator disc, the reduction gearing and the reverse can easily be controlled by using a fluid under pressure.

A transmission mechanism for motor vehicles is already known which comprises a hydrokinetic torque converter mounted in series with a variator comprising internally tangent male and female tapered discs. However, hitherto known constructions of this character have a relatively low efficiency due to the considerable number of gears in constant meshing engagement. Also objectionable in these known transmissions is the use of a selective clutch control for changing from forward drive to reverse. The great number of moving parts, the large-sized clutches and control means therefore are hardly compatible with modern mass-production requirements.

It is the object of this invention to avoid the inconveniences briefly set forth hereinabove by providing a transmission mechanism for automotive vehicles and the like, which comprises a hydrokinetic torque converter having its output shaft drivingly connected to a friction-type variator comprising a single disc rigid with its input shaft, said converter and said variator being mounted in a common main casing, said disc being interposed between a pair of rings rigid with its output shaft, said rings being adapted to clamp or release said disc for connecting or disconnecting said variator to or from the drive, respectively, this transmission mechanism being characterized in that the output shaft of said torque converter carries a driving pinion rigid with said output shaft and in constant meshing engagement with a pair of driven pinions, one of said driven pinions being rigid with the input shaft of said variator which is rotatably mounted in a separate movable case adapted to pivot about the output shaft of said converter, the output shafts of said variator and said mechanism, which are parallel to said converter output shaft, being interconnected through a pair of pinions providing the drive in the forward direction when the variator is in operation, the other one of said driven pinions being mounted for free rotation on said output shaft of the transmission mechanism, and that means for temporarily coupling said last-named pinion to said transmission mechanism output shaft are provided for driving this mechanism in reverse, in which case said variator is inoperative.

Other features characterizing this invention will appear as the following description proceeds with reference to the attached drawing illustrating diagrammatically by way of example a typical form of embodiment thereof. In the drawing.

Figure 1:
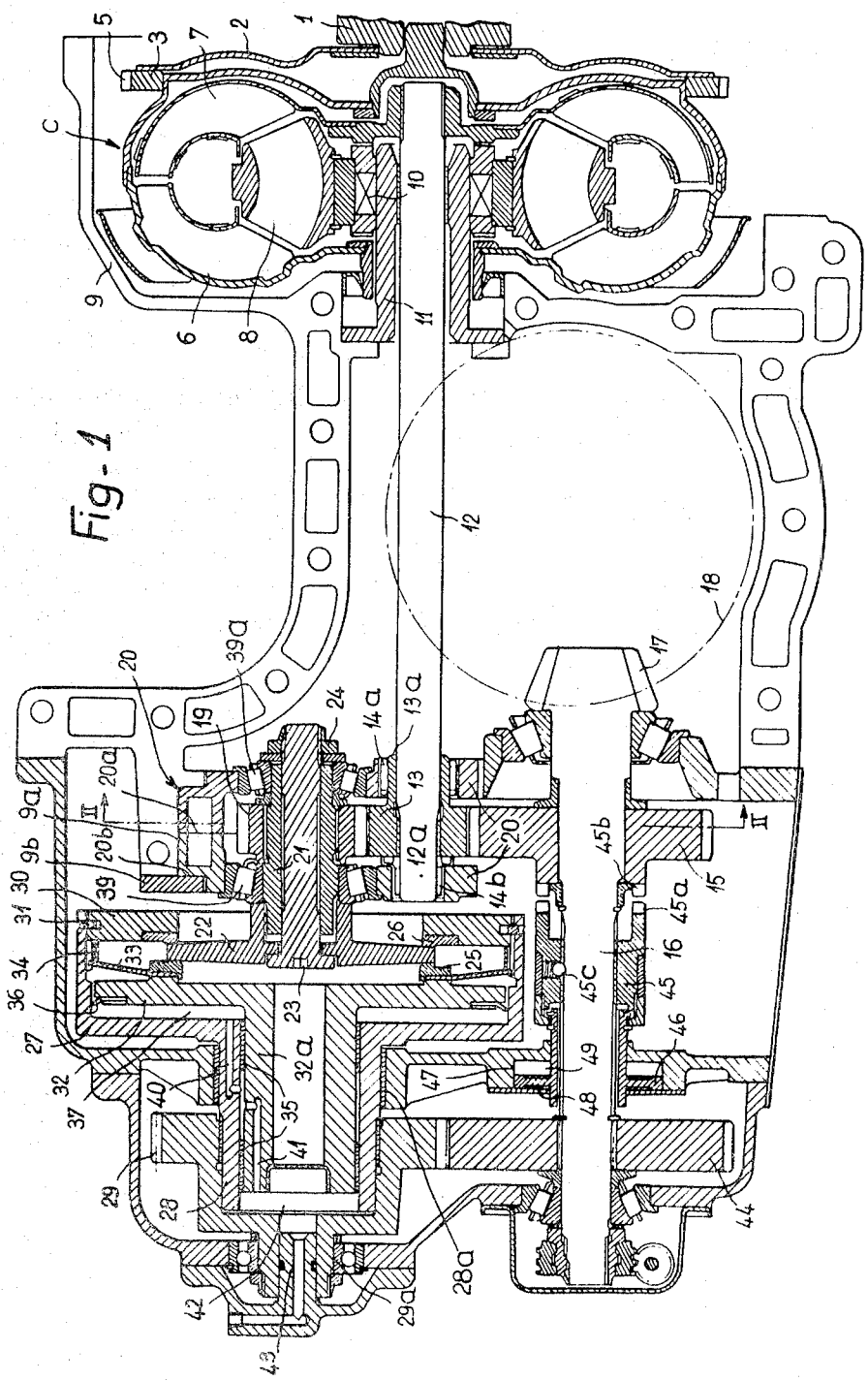
FIG. 1 is a longitudinal sectional view of the transmission mechanism.

Referring firstly to FIG. 1, the mechanism illustrated therein comprises a hydrokinetic or hydraulic torque converter designated in general by the reference letter C and mounted on the primary shaft 1 driven from the engine (not shown). This shaft comprises a driving plate 2 carrying on its outer periphery a ring 3 formed with teeth 5 engageable by the pinion of a starter motor (not shown). This toothed ring 3 is rigid with the vaned impeller or pumping member 6 of converter C, the reaction member 8 of this converter being centered in the casing 9 by means of a freewheel 10 and a bearing 11, the latter also serving for said impeller 6. The runner or turbine 7 of this converter C comprises a hub rigidly connected through splines to the input end of the output shaft 12 of converter C.

This shaft 12 extends in this example through the differential casing of the transmission and carries on its splined driving end 12a a pinion 13 of which the tubular shank 13a, together with said shaft end 12a, are trunnioned in needle bearings 14a, 14b mounted in a movable auxiliary case 20 pivotally mounted in turn about an axis coincident with that of said shaft 12; the function of this movable case 20 will be explained in detail presently.

The pinion 13 is in meshing engagement with another pinion 15 provided with dog teeth and mounted for loose rotation on a shaft 16 carrying the driving bevel pinion 17 of said differential, of which the crown-wheel is shown only diagrammatically at 18.

The aforesaid pinion 13 is also in constant meshing engagement with a pinion 19 carried through splines by the tubular input shaft 21 of the variator which is rotatably mounted in said movable case 20 with the interposition of roller-bearings 39, 39a and carries a biconical disc 22 made preferably from a material having a high resistance to frictional wear, such as manganese steel alloy. This disc 22 rotatably connected to shaft 21 through splines is held against axial movement in relation thereto by a tightening device comprising a screw 23 extending through said tubular shaft 21 and a nut 24 engaging through a suitable washer one of the aforesaid roller-bearings, the other bearing being engaged by the aforesaid disc 22.

Co-acting with this disc 22 are a pair of rings 25 and 26 disposed on either side thereof and provided with friction faces adapted to provide a good surface contact with the registering faces of the disc 22. These rings consist preferably of a suitable sintered material ensuring a satisfactory coefficient of friction with the disc. These rings are friction-mounted in supports disposed within a bell-shaped member 27 rigid with an output shaft 28 of the variator which is rotatably mounted in a bearing 28a of the main casing and carries through splines another pinion 29 having a shank 29a mounted in a bearing fitted in said main casing. Said supports consist of a plate 30 rotatably coupled through splines with said bell-shaped member 27 and retained in the axial direction therein by a resilient ring 31, the other of a pinion 32 slidably mounted in said bell-shaped member. A resilient diaphragm 33 rotatably connected through peripheral teeth engaging splines formed in said bell-shaped member 27 is disposed between said ring 25 and piston 32. This diaphragm 33 is kept at a suitable axial spacing from plate 30 by means of an annular distance-piece 34 and constantly urges the rings to a release position in relation to said disc. Co-acting with this diaphragm 33 on the side opposite to said rings is a pressure member consisting of said piston 32 having a rod 32a slidably mounted in said shaft 28 with the interposition of a two-section or two shell bearing 35 forming in conjunction with said shank 29a of pinion 29 a chamber 42 adapted to be supplied with fluid under pressure, the piston 32 being adapted to slide in a fluid-tight manner due to the provision of a seal 36 in bell-shaped member 27 with which it constitutes a chamber 37 constantly communicating with chamber 42 via ducts 40 in shaft 28 and 41 in piston rod 32a. Chamber 42 is fed with pressure fluid through a friction-packing union 43 projecting into said pinion shank 29a and secured to the casing of the mechanism.

Figure 2:
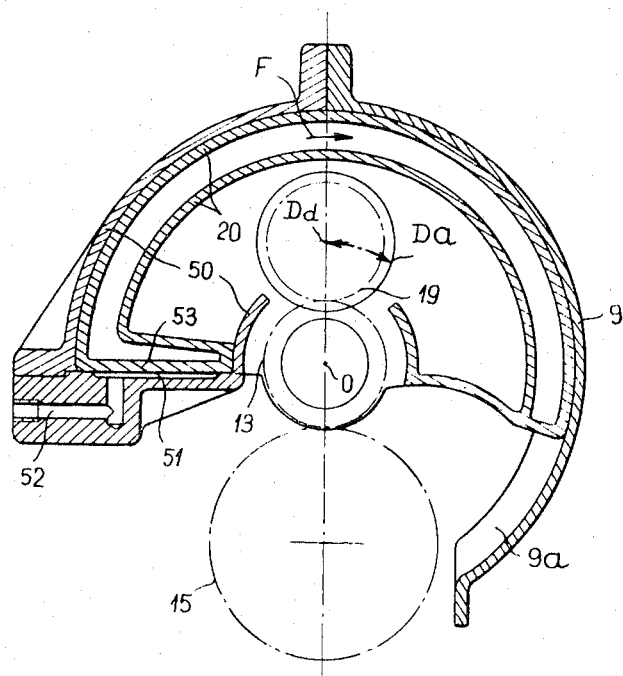
FIG. 2 is a fragmentary cross-sectional view taken along the line II—II of FIG. 1.

As clearly apparent from FIGS. 1 and 2, the movable case 20 consists of a two-section assembly of substantially semi-circular configuration, the sections being assembled along the joint plane 20a and mounted in a corresponding cavity 9a formed in the main casing 9 and so shaped that said movable case 20 can revolve in this cavity about an axis O coincident with that of shaft 12 received by the case sections as already explained in the foregoing. This case 20 is retained in the axial direction, in its cavity 9a, by a half-ring 9b co-acting with a shoulder 20b formed in said case.

This case 20 further comprises, in a plane substantially radial in relation to the axis O, a piston-forming portion 53 adapted to slide in fluid-tight relationship in an arcuate cylinder 50 formed in the main casing 9, this piston and cylinder assembly providing a chamber 51 adapted to receive fluid under an adjustable pressure through a duct 52 provided with a tapped hole formed in said casing 9 for fitting a pipe line union (not shown).

The pinion 29 is constantly meshing with another pinion 44 rotatably connected through splines to shaft 16. This shaft 16 also carries through splines a sliding-hub 45 provided with dog teeth corresponding to those carried by pinion 15, these dog teeth being shown at 45a and 45b. The sliding-hub 45 is also axially solid with a double-acting hydraulic actuator comprising a piston 46 slidably mounted on shaft 16 and in a cylinder 47 formed in one portion of the fixed or main casing 9, this piston forming therein a pair of tandem chambers 48, 49 adapted to receive fluid under pressure for actuating the dog clutch.

The above-described transmission operates as follows:

In neutral, with the engine running, the dog clutch 45a, 45b is disconnected as a consequence of the pressure fluid fed to chamber 49. The sliding hub 45 is retained in this position by suitable detent-positioning means, for example a spring-loaded ball 45c.

Fluid under pressure is directed into chamber 51 so that the movable case 20 can pivot in the direction of the arrow F (see FIG. 2) and the axis of the rotation of the variator disc 22, which is also that of pinion 19, lies initially in the maximum eccentric position in relation to the axis of rings 25, 26 denoted D$a$ in FIG. 2, which corresponds to the maximum reduction ratio, the other extreme position denoted D$d$ corresponding to the mutually aligned position of the axes of disc 22 and said rings 25, 26 and shaft 28, respectively.

Starting and forward drive are obtained by gradually increasing the fluid pressure applied to chambers 37 and 42, so that when the engine is accelerated to drive the disc 22 through converter C, the rings 25, 26 initially allowed to revolve within their supports are caused to clamp the variator disc 22 with an increasing pressure, until these rings become rotatably solid with support 30 and diaphragm 33. Under these conditions the driving progressiveness applied to the troque transmission by converter C is completed by that inherent to the variator mechanism.

It will be noted that during the operation the disc 22 of this variator constantly tends to center itself between the rings 25, 26 against the force resulting from the fluid pressure in chamber 51; in other words, properly controlling this fluid pressure will ensure a continuous variation in the reduction ratio given by this variator between the maximum reduction ratio corresponding to position D$a$ and that corresponding to position D$d$. This control action may be derived if desired from an automatic governor adapted in the well-known fashion to adjust the fluid pressure as a function of the engine-load and vehicle-speed parameters, so that the increment in the vehicle-speed will tend to increase the transmission ratio and the increment in the engine-load will tend to reduce this ratio; an automatic governor of this character is described and illustrated in the French Pat. No. 1,232,550.

In forward drive conditions the torque transmission is thus via converter C and the pairs of pinions 13, 19 and 29, 44. Reverse is obtained via the pair of pinions 13, 15 after the dog teeth 45a of the latter have been brought into driving engagement with dog teeth 45b, so that torque is transmitted only through the converter C and pinions 13, 15.

It is a specific feature of the mechanism of this invention that the engagement of reverse from neutral is facilitated and can take place smoothly and without resorting to synchromesh devices, the mutual engagement of dogs 45a and 45b being controlled by introducing fluid under pressure into the chamber 48 of cylinder 47, since only a moderate fluid pressure in chambers 37 and 42, in the neutral condition, is sufficient for holding the disc 22 of the variator against rotation, and therefore the output shaft 12 of converter C and the aforesaid pinion 15 to be brought into meshing engagement through dogs. When this engagement has been obtained, the pressure then prevailing in chambers 37 and 42 is removed so that the variator is definitely inoperative during the transmission of torque in reverse drive conditions, its resilient diaphragm 33 keeping the rings 25, 26 released from disc 22.

Of course, various modifications and variations may be applied to the specific form of embodiment of the instant invention which is shown and described herein, without departing from the scope of the invention as set forth in the appended claims.

What is claimed as new is:

1. A transmission mechanism for automotive vehicles which comprises a friction type variator, a hydrokinetic torque converter having an output shaft drivingly connected to said friction type variator and a common main casing having therein both said converter and said variator, said friction type variator comprising an input shaft, a single disc rigid with said input shaft, first and second output shafts, a pair of rings mounted on said first output shaft and having said disc therebetween, said rings being adapted to selectively clamp and release said disc for connecting and disconnecting said variator to and from the mechanism, respectively, a driving pinion rigid with the output shaft of said torque converter, a pair of driven pinions in constant meshing engagement with said driving pinion, one of said driven pinions being rigid with the input shaft of said variator, a separate movable case adapted to pivot about the output shaft of said converter, the input shaft of said variator being rotatably mounted in said movable case, a pair of pinions interconnecting said first and second output shafts, which are parallel to said converter output shaft providing drive in the forward direction when the variator is in operation, the other of said driven pinions being mounted for free rotation on said second output shaft and, means for temporarily coupling said last-named pinion to said second output shaft for driving said mechanism in reverse when said variator is inoperative.

2. A transmission mechanism according to claim 1, further comprising means to guide said movable case supporting the input shaft of said variator during its pivotal movements and a bearing concentric with both the pivot axis of said movable case and the output shaft of said converter.

3. A transmission mechanism according to claim 1, wherein said movable case supporting the input shaft of said variator comprises an arcuate cylinder formed in said main casing, a piston movable within said cylinder and means to direct a control fluid under an adjustable pressure against said piston.

4. A transmission mechanism according to claim 1, wherein said temporary coupling means comprises a dog clutch device disposed between said other driven pinion and the second output shaft, said dog clutch device comprising a sliding hub axially movable on said second output shaft and responsive to a concentric double-acting actuator.

5. A transmission mechanism according to claim 1, wherein the disc of said variator consists of manganese steel alloy and said clamping rings consist of sintered material.

References Cited
UNITED STATES PATENTS

| | | | |
|---|---|---|---|
| 3,557,636 | 1/1971 | Dangauthier | 74—732 |
| 1,823,226 | 9/1931 | Abbott, Jr. | 74—199 |
| 2,222,281 | 11/1940 | Beier | 74—199 X |
| 3,006,206 | 10/1961 | Kelley et al. | 74—199 X |
| 3,060,758 | 10/1962 | Kano | 74—199 |
| 3,387,507 | 6/1968 | DeCastelet | 74—199 X |
| 3,453,904 | 7/1969 | Dangauthier | 74—199 X |
| 3,496,789 | 2/1970 | Henry-Biabaud | 74—730 |

FOREIGN PATENTS

| | | | |
|---|---|---|---|
| 1,385,059 | 11/1964 | France | 74—199 |

CARLTON R. CROYLE, Primary Examiner

T. C. PERRY, Assistant Examiner

U.S. Cl. X.R.

74—199